United States Patent
Misani et al.

(10) Patent No.: US 11,970,028 B2
(45) Date of Patent: Apr. 30, 2024

(54) MOTORCYCLE TYRE

(71) Applicant: Pirelli Tyre S.p.A., Milan (IT)

(72) Inventors: Pierangelo Misani, Milan (IT); Luca Bruschelli, Milan (IT); Giuliano Bonaccorsi, Milan (IT)

(73) Assignee: PIRELLI TYRE S.p.A., Milan (IT)

(*) Notice: Subject to any disclaimer, the term of this patent is extended or adjusted under 35 U.S.C. 154(b) by 499 days.

(21) Appl. No.: 16/755,517

(22) PCT Filed: Oct. 11, 2018

(86) PCT No.: PCT/IB2018/057881
§ 371 (c)(1),
(2) Date: Apr. 10, 2020

(87) PCT Pub. No.: WO2019/082012
PCT Pub. Date: May 2, 2019

(65) Prior Publication Data
US 2021/0122191 A1  Apr. 29, 2021

(30) Foreign Application Priority Data
Oct. 26, 2017  (IT) .................. 102017000121753

(51) Int. Cl.
*B60C 11/00* (2006.01)
*B60C 11/03* (2006.01)
*B60C 11/117* (2006.01)

(52) U.S. Cl.
CPC ........ *B60C 11/033* (2013.01); *B60C 11/0058* (2013.01); *B60C 11/0302* (2013.01); *B60C 2011/0025* (2013.01); *B60C 2200/10* (2013.01)

(58) Field of Classification Search
CPC .................. B60C 11/033; B60C 11/0041
(Continued)

(56) References Cited

U.S. PATENT DOCUMENTS 8,695,660 B2  4/2014  Nakagawa
2007/0137747 A1* 6/2007  Yoshida .................. B60C 11/00
                                                152/209.5
(Continued)

FOREIGN PATENT DOCUMENTS

CN  101903186 A  12/2010
CN  102046396 A   5/2011
(Continued)

OTHER PUBLICATIONS

Machine Translation: JP-2009029176-A, Hidemitsu N, (Year: 2022).*
(Continued)

*Primary Examiner* — Kendra Ly
(74) *Attorney, Agent, or Firm* — Finnegan, Henderson, Farabow, Garrett & Dunner, L.L.P.

(57) ABSTRACT

It is described a motorcycle tyre (100) intended to be fitted to a wheel of a motorcycle of the "supersport" segment, comprising an equatorial plane and a tread band extending in axial direction with a given axial development, wherein the tread band comprises a first annular portion made of a first elastomeric material, having a first dynamic shear storage modulus measured at 70° C., and at least one second annular portion made of a second elastomeric material, having a second dynamic shear storage modulus measured at 70° C., different form said first dynamic shear storage modulus measured at 70° C.

22 Claims, 4 Drawing Sheets

(58) Field of Classification Search
USPC .................................................... D12/535
See application file for complete search history.

(56) References Cited

U.S. PATENT DOCUMENTS

| | | | | |
|---|---|---|---|---|
| 2010/0200132 | A1* | 8/2010 | Funahara | ............ B60C 11/0058 |
| | | | | 152/209.5 |
| 2011/0308690 | A1 | 12/2011 | Bordoz et al. | |
| 2012/0024446 | A1* | 2/2012 | Nakagawa | .......... B60C 11/0058 |
| | | | | 152/450 |
| 2013/0199683 | A1* | 8/2013 | Takenaka | ............ B60C 11/0302 |
| | | | | 152/209.8 |
| 2018/0264886 | A1* | 9/2018 | Bruschelli | ........... B60C 11/0302 |

FOREIGN PATENT DOCUMENTS

| | | | | |
|---|---|---|---|---|
| CN | 103561968 | A | 2/2014 | |
| EP | 2662226 | A1 * | 11/2013 | ......... B60C 11/0058 |
| EP | 2662226 | A1 | 11/2013 | |
| JP | H 9-136504 | A | 5/1997 | |
| JP | 2009029176 | A * | 2/2009 | ......... B60C 11/0058 |
| JP | 2009-214685 | | 9/2009 | |
| JP | 2012148680 | A * | 8/2012 | |
| JP | 2013226933 | A * | 11/2013 | |
| JP | 2015048051 | A * | 3/2015 | |
| WO | WO 9311951 | A1 | 6/1993 | |
| WO | WO 2017/064585 | A1 | 4/2017 | |
| WO | WO-2017064585 | A1 * | 4/2017 | ......... B60C 11/0302 |

OTHER PUBLICATIONS

Machine Translation: JP-2015048051-A, Takeuchi H, (Year: 2022).*
Machine Translation: JP-2012148680-A, Matsunami T, (Year: 2023).*
Machine Translation: JP-2013226933-A, Taniguchi T, (Year: 2023).*
International Search Report form the European Patent Office in corresponding International Application No. PCT/IB2018/057881 dated Dec. 10, 2018.
Written Opinion of the International Searching Authority from the European Patent Office in corresponding International Application No. PCT/IB2018/057881 dated Dec. 10, 2018.
First Office Action dated Jul. 19, 2022, from Brazilian Patent Office, in counterpart Brazilian Application No. 112020006504.
Notification of the Second Office Action dated Jul. 28, 2022, from China National Intellectual Property Administration, in counterpart Chinese Application No. 201880067348.9.

* cited by examiner

MOTORCYCLE TYRE

This application is a national stage entry application under 35 U.S.C. § 371 based on International Application No. PCT/IB2018/057881, filed Oct. 11, 2018, and claims priority to Italian Patent Application No. 102017000121753, filed Oct. 26, 2017; the contents of each application is incorporated herein by reference.

FIELD OF THE INVENTION

The present invention relates to a motorcycle tyre. In particular, the present invention relates to a tyre intended to be fitted to wheels of high-performance motorcycles, such as for example tyres for motorcycles of the "Supersport" segment having large engine capacity (e.g. 600 cm3 or higher), and/or high power (e.g. 140-180 hp or higher), which can be used also on track.

PRIOR ART

Motorcycle tyres are known from US20110308690 and U.S. Pat. No. 8,695,660.

SUMMARY OF THE INVENTION

Tyres fitted to wheels of high-performance motorcycles, such as supersport motorcycles, are required to have an excellent grip to the ground, so as to be able to effectively transfer to the ground a high torque both when driving straight and when accelerating while leaving a bend, and to ensure an effective braking action. Grip is particularly important when driving on a wet road surface.

For allowing the motorcyclist to reach such a high performance in safe conditions, besides excellent grip to the ground, the tyres shall also have a stable behavior both when driving straight and when driving on a bend, particularly under high acceleration/deceleration conditions.

For improving the tyre grip it is possible, when manufacturing the tread band, to use so-called soft compounds, which better adapt themselves to asperities of the road surface by replicating its irregular profile. These compounds are typically characterized by a low storage modulus and/or high hysteresis.

However, the Applicant noticed that too soft compounds cause a reduction in stability when driving straight and a reduction in the tyre mileage.

In order to overcome the aforesaid problems, tyres have been proposed which have tread bands made of different compounds. Typically, a softer compound at the shoulders and a less soft compound at the crown.

The Applicant noticed, however, that the presence of several compounds in the tread band, particularly several compounds characterized by different storage moduli, produces a discontinuity in the tyre structure, which is perceived by the motorcycle driver as driving instability, particularly at the interface between the compounds. This phenomenon becomes more relevant in critical conditions, such as strong accelerations/decelerations when leaving/entering a bend or high-speed driving on bends to which the tyre is subjected on track.

The Applicant has thus faced the problem of providing motorcycle tyres which, also when several compounds—in particular several compounds whose elastic features differ even substantially from one another—are used, are able to ensure safe use on roads in to any driving condition, also on wet grounds, while maintaining a high capacity of performance, so as to allow them to be used also on track, and, particularly in the latter case, do not transfer to the motorcycle driver an instability feeling.

The Applicant focused his efforts on achieving this improvement by making a tyre provided with a tread band made of at least two compounds located in adjacent annular portions, wherein the positioning of the interface between the two compounds synergistically cooperates with the distribution and positioning of the grooves in the tread band, in order to reduce the structural and behavioral inhomogeneity of the tyre, particularly on track.

In a first aspect thereof, the invention relates to a motorcycle tyre comprising an equatorial plane and a tread band having a given axial development, wherein:
- the tread band comprises a first annular portion made of a first elastomeric material, having a first dynamic shear storage modulus measured at 70° C., and at least one second annular portion made of a second elastomeric material, having a second dynamic shear storage modulus measured at 70° C., different form the first dynamic shear storage modulus;
- the first annular portion being located in a tread band region located at a distance from the equatorial plane equal to at least 25% of the axial development;
- the second annular portion being located axially inwardly and adjacent to the first annular portion so as to define a first interface dividing the first annular portion from the second annular portion in axial direction;
- the tread band comprising a plurality of grooves defining a trend of the void-to-rubber ratio of the tread band at said first interface which increases along the axial development from the first annular portion to the second annular portion;
- the void-to-rubber ratio at the first interface being greater than or equal to 3% and smaller than or equal to 15%.

The Applicant has made a tyre having a tread band made of several compounds located in adjacent annular portions so as to optimize grip and performance for any kind of road surface and for any kind of road use as well as of sporty use on track.

Such a tyre is further provided with a number and distribution of grooves which synergistically cooperate with the positioning of the interface between the compounds, particularly the interface between shoulder and adjacent annular portion, for reducing the driving instability typically generated by the different stiffness of adjacent tread band portions made of different compounds.

Contrary to what has been believed so far, the Applicant is of the opinion that the interface between the compounds of the tread band, particularly the interface between the axially outer or shoulder compound and the axially adjacent one, shall not be positioned in a tread band region substantially without grooves and/or having a minimum void-to-rubber ratio, but rather in a tread band region having a given number of grooves and a given value of the void-to-rubber ratio.

Without wishing to be bound to any particular theory, the Applicant is of the opinion that the presence of a number of grooves and a given distribution of the same at the interface between the two compounds does cause the effects generated by two structural discontinuities to add up and become amplified, but rather their mutual mitigation.

Generally speaking, the Applicant is of the opinion that the structural discontinuity generated by a given groove distribution at the interface between the two compounds, particularly between the shoulder compound and the axially adjacent one, by modifying the distribution of the stresses acting on the tread band, contributes to reducing the feeling of structural discontinuity caused by a different stiffness of the compounds, which is transmitted to the motorcycle driver, and thus the feeling of driving instability. For the purposes of the present invention, the following definitions apply:

By "tread pattern" it is meant the representation of each point of the tread band (grooves included) on a plane perpendicular to the equatorial plane of the tyre and tangent to the maximum diameter of the tyre.

Angular measurements, and/or linear quantities (distances, widths, lengths, etc.), and/or surface areas are to be intended as referred to the tread pattern as defined above.

By "axial development" of the tread band or of portions thereof it is meant the development of the radially outermost profile of the tread band or of portions thereof in a cross section of the tread band taken in a plane containing the rotation axis of the tyre. Moreover, referring to the angular arrangement of the grooves formed in the tread band relative to the equatorial plane of the tyre, such an angular arrangement is to be intended, for each point of the groove, as referred to the angle (comprised between 0° and 90° in absolute value) defined by a rotation made starting from the equatorial plane up to the direction tangent to the groove passing through that point.

By "motorcycle tyre" it is meant a tyre having a high curvature ratio (typically greater than 0.2), which allows high camber angles to be reached when the motorcycle runs on a bend.

By "equatorial plane" of the tyre it is meant a plane perpendicular to the rotation axis of the tyre and dividing the tyre into two equal portions.

By "circumferential" direction it is meant a direction generically directed according to the rotation direction of the tyre, or in any case only slightly inclined relative to the rotation direction of the tyre.

By "overall void-to-rubber ratio" it is meant the ratio of the total surface area of the grooves of a given annular portion of the tread band (possibly of the whole tread band) and the total surface area of the whole tread band.

By annular sector it is meant a tread band portion circumferentially extending along the whole tread band and having a given axial extension (e.g. 10 mm).

The distance of a tread annular sector from the equatorial plane or the distance between annular sectors form each other is measured axially referring to the center plane of the sector(s) parallel to the equatorial plane.

By "void-to-rubber ratio of an annular sector" or generically "void-to-rubber ratio" it is meant the ratio between the total surface area of the grooves of an annular sector or annular region and the total surface area of the same annular sector or annular region. The present invention, in one or more preferred aspects thereof, may comprise one or more of the features hereinafter presented.

Preferably, the void-to-rubber ratio at said first interface may be greater than or equal to 3% and smaller than or equal to 10%.

Even more preferably, the void-to-rubber ratio at said first interface may be greater than or equal to 4% and smaller than or equal to 9%.

Advantageously, the void-to-rubber ratio trend increases from a minimum value associated with an annular sector of the first annular portion to a maximum value associated with an annular sector of the second annular portion; said annular sector of the second annular portion being located along the axial development at a distance from the equatorial plane greater than or equal to 20% of the axial development of the tread band.

Preferably, the first interface may be spaced apart from said annular sector of the second annular portion by a distance smaller than 60% of a distance in axial direction between said annular sector of the first annular portion and said annular sector of the second annular portion.

Conveniently, the first interface is spaced apart from said annular sector of the second annular portion by a distance smaller than 50% of the distance in axial direction between said annular sector of the first annular portion and said annular sector of the second annular portion.

Advantageously, the first interface may be spaced apart from said annular sector of the second annular portion by a distance greater than 5% of the distance in axial direction between said annular sector of the first annular portion and said annular sector of the second annular portion.

Advantageously, the first interface is spaced apart from the equatorial plane by a distance greater than or equal to 27% of the axial development of the tread band.

Preferably, the first interface may be spaced apart from the equatorial plane by a distance smaller than or equal to 35% of the axial development of the tread band.

Preferably, the first interface may be spaced apart from the equatorial plane by a distance smaller than or equal to 33% of the axial development of the tread band.

Advantageously, the second annular portion may be located along the axial development at a distance from the equatorial plane greater than or equal to 5% of the axial development of the tread band.

Conveniently, the grooves of the tread band may define an overall void-to-rubber ratio of the tread band greater than or equal to 4% and smaller than or equal to 10%.

Advantageously, the first annular portion has an overall void-to-rubber ratio equal to or smaller than to 3%.

Conveniently, an annular region of the first annular portion which is axially most spaced apart from the equatorial plane has an overall void-to-rubber ratio substantially equal to zero.

Preferably, the ratio of the first dynamic shear storage modulus measured at 70° C. and the second dynamic shear storage modulus measured at 70° C. is smaller than or equal to 0.85.

Advantageously, the ratio of the first dynamic shear storage modulus measured at 70° C. and the second dynamic shear storage modulus measured at 70° C. is smaller than or equal to 0.7.

Preferably, the ratio of the first dynamic shear storage modulus measured at 70° C. and the second dynamic shear storage modulus measured at 70° C. is greater than or equal to 0.4.

Conveniently, the tread band comprises a third annular portion located across the equatorial plane; two first annular portions opposed to each other relative to the third annular portion and two second annular portions each located between a first annular portion and the third annular portion.

Advantageously, there is at least one second interface dividing the third annular portion from one second annular portion in axial direction.

Preferably, the third annular portion may be made of a third elastomeric material having a third dynamic shear storage modulus measured at 70° C. different from the first dynamic shear storage modulus measured at 70° C.

Advantageously, the third annular portion has an overall void-to-rubber ratio equal to or smaller than 3%, preferably equal to or smaller than 1%.

Advantageously, the third annular portion may have an axial development smaller than or equal to 20% of the axial development of the tread band.

Preferably, each second annular portion may have an axial development greater than or equal to 15% of the axial development of the tread band.

Conveniently, each first annular portion may have an axial development smaller than or equal to 15% of the axial development of the tread band.

Preferably, each second annular portion may have an overall void-to-rubber ratio greater than or equal to 5% and smaller than or equal to 10%.

Advantageously, the first interface may converge towards the equatorial plane form the inside to the outside of the tread band, being oriented according to a direction inclined by an angle of between 10° and 20° relative to the equatorial plane.

Conveniently, the second interface may converge towards the equatorial plane from the inside to the outside of the tread band, being oriented according to a direction inclined relative to the equatorial plane by an angle of between 30° and 40° relative to the equatorial plane.

Further features and advantages of the invention shall become clearer from the detailed description of some preferred, although not exclusive, embodiments of a tyre according to the present invention, intended to be fitted to a wheel of a motorcycle.

BRIEF DESCRIPTION OF THE DRAWINGS

Such description shall be made hereafter with reference to the accompanying drawings, provided only for indicating, and thus non-limiting, purposes, wherein.

DETAILED DESCRIPTION OF EMBODIMENTS OF THE INVENTION

Figure 1:
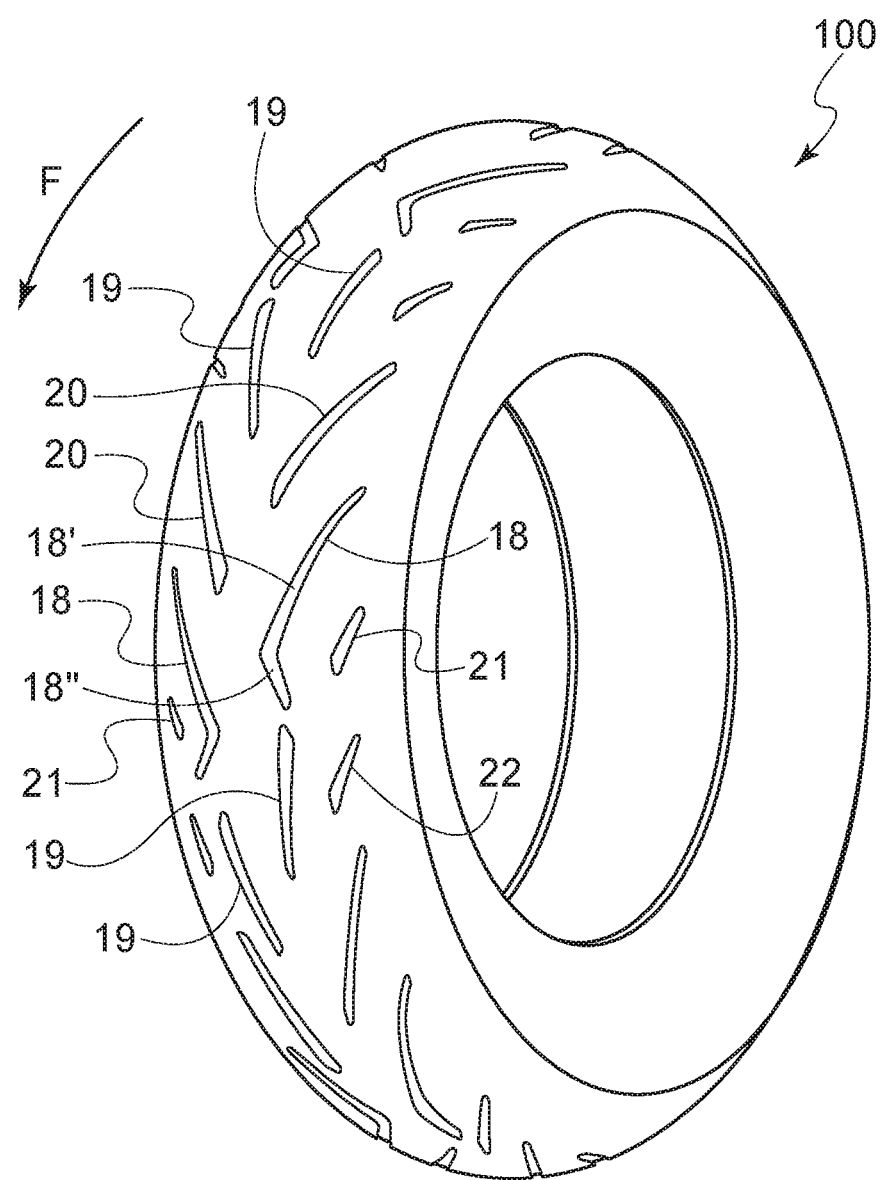
FIG. 1 shows a perspective view of a first example of a tyre according to the invention, intended to be fitted to the rear wheel of a motorcycle.
Figure 2:
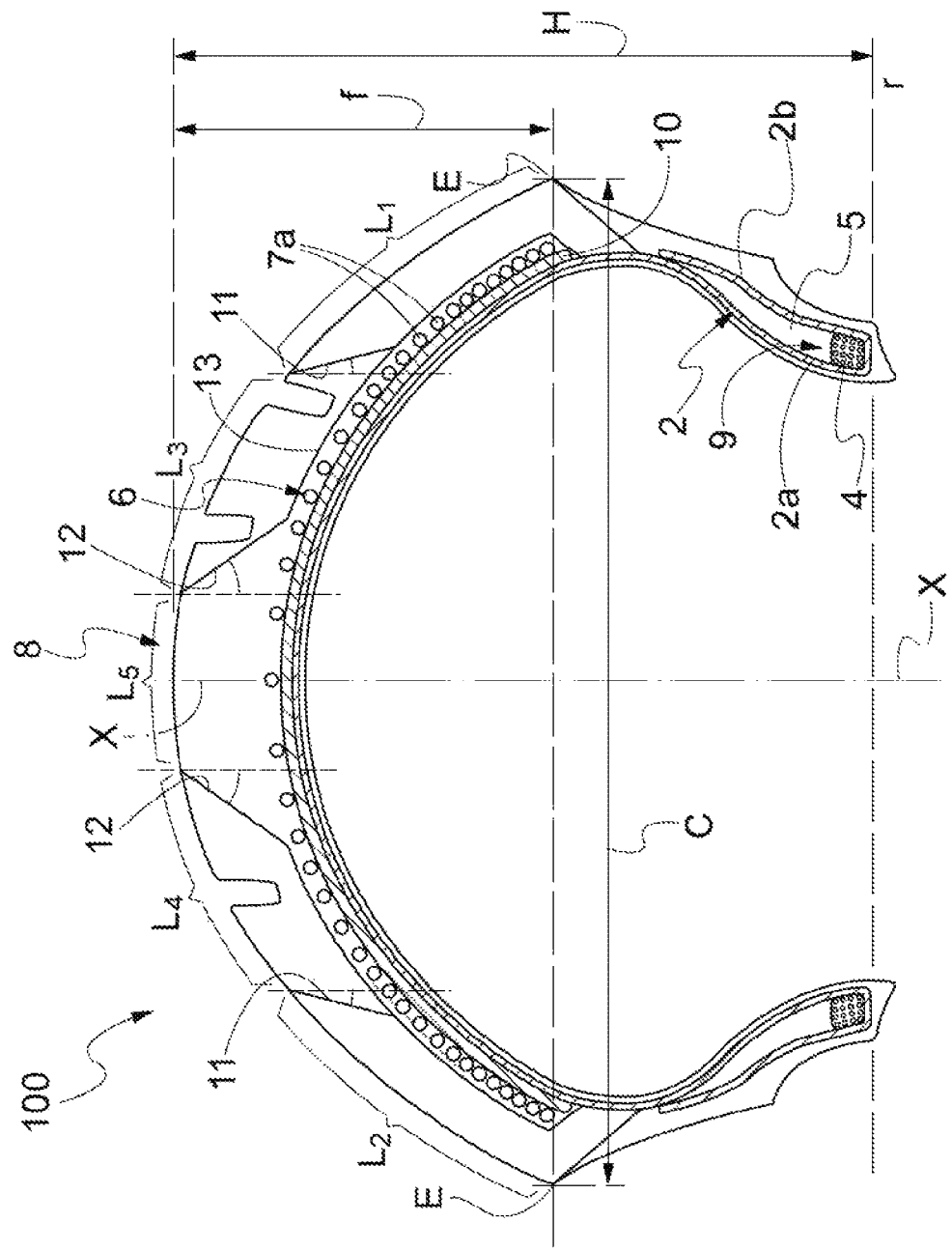
FIG. 2 is an enlarged view of a cross section of the tyre of FIG. 1.
Figure 4:
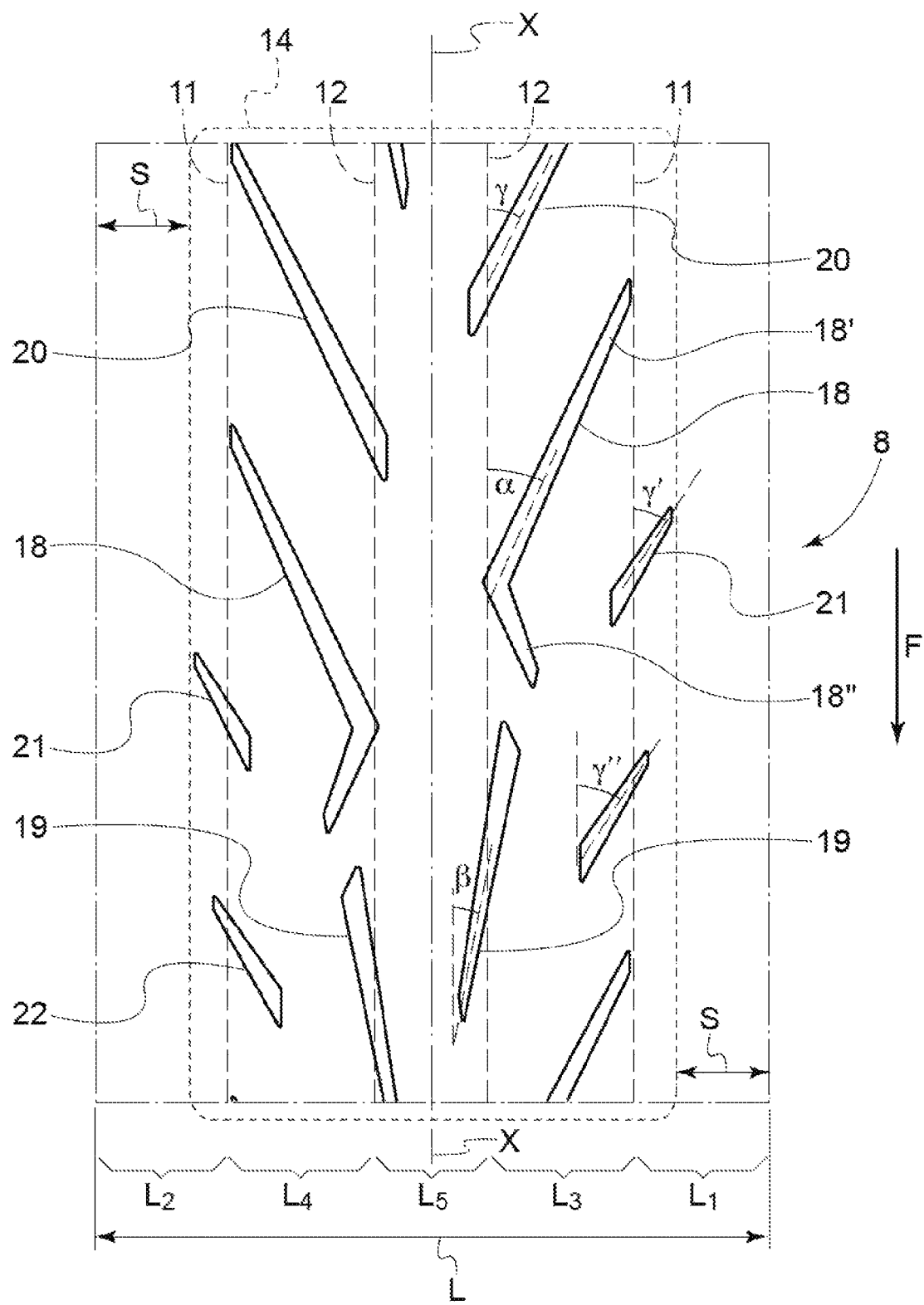
FIG. 4 is a schematic plan view of a portion of the tread band of the tyre of FIG. 1.

In FIGS. 1, 2 and 4 a tyre for motorcycle wheels according to the present invention is generally indicated at 100. The tyre is preferably intended to be used on a rear wheel of a motorcycle with large engine capacity, e.g. 600 cc.

An equatorial plane X-X and a rotation axis (not shown) are defined in the tyre 100. Moreover, there are defined a circumferential direction (indicated in FIGS. 1 and 4 by an arrow F pointing in the rotation direction of the tyre) and an axial direction, indicated in FIG. 2 by an axis r perpendicular to the equatorial plane X-X.

The tyre 100 comprises a carcass structure 2 comprising at least one carcass layer 2a, made of an elastomeric material and comprising a plurality of reinforcing elements arranged parallel to one another.

The at least one carcass layer engages, by means of opposite circumferential edges thereof, also superimposed, at least one annular reinforcing structure 9.

In particular, the opposite lateral edges of the at least one carcass layer 2a are turned up about annular reinforcing structures, called bead cores 4.

A tapered elastomeric filling 5 taking up the space defined between the carcass layer 2a and the respective turned-up lateral edge 2b of the carcass layer 2a is applied onto the axially outer perimeter edge of the bead cores 4.

As known, the tyre region comprising the bead core 4 and the filling 5 forms the so-called bead, intended for anchoring the tyre to a respective fitting rim, not shown.

Still referring to the embodiment shown in FIG. 2, the reinforcing elements included in the carcass layer 2a preferably comprise textile cords, selected from those usually adopted in the manufacture of carcasses for tyres, for example Nylon, Rayon, PET, PEN, Lyocell cords, with an elementary filament having a diameter of between 0.35 mm and 1.5 mm, or steel metal cords with an elementary filament having a diameter of between 0.10 mm and 0.5 mm.

Preferably, the textile materials for manufacturing the carcass structure are Rayon and/or Lyocell.

In an embodiment not shown, the carcass structure has its opposite lateral edges associated without a turn-up with special annular reinforcing structures provided with two annular inserts. A filling of elastomeric material may be located in an axially outer position relative to the first annular insert. The second annular insert is instead located in an axially outer position relative to the end of the carcass ply. Finally, in an axially outer position relative to said second annular insert, and not necessarily in contact with the same, a further filling may be provided which terminates the formation of the annular reinforcing structure.

A tread band 8 is circumferentially applied, in a radially outer position, onto the carcass structure 2. Longitudinal and/or transverse grooves, arranged so as to define a desired tread pattern, are typically formed on the tread band 8 further to a molding operation carried out at the same time with the vulcanization of the tyre.

The tyre 100 may comprise a pair of sidewalls laterally applied on opposite sides to said carcass structure 2.

The tyre 100 has a section height H measured, at the equatorial plane, between the top of the tread band and the fitting diameter, identified by a reference line r, passing through the tyre beads.

The tyre 100 further has a cross section maximum width C defined by the distance between the laterally opposite ends E of the tread profile, and a curvature ratio, defined as the ratio between the distance f of the top of the tread from the line passing through the ends E of the tread itself, measured at the equatorial plane of the tyre, and the aforesaid maximum width C. The ends E of the tread may be formed by a corner.

In particular, the tyre 100 has a cross section characterized by a high curvature ratio, preferably a curvature ratio f/C at least equal to about 0.30.

In an embodiment, the motorcycle tyre of the invention is intended to be fitted to a rear wheel having chord dimensions substantially comprised between 160 and 210 mm.

Preferably, the distance f of the radially outer point of the tread from the line passing through the laterally opposite ends of the tread itself of the rear tyre is substantially comprised between 50 and 70 mm. Preferably, for a rear tyre, the transverse curvature ratio f/C is substantially higher than 0.30, even more preferably it is comprised between 0.30 and 0.35. Preferably, the ratio (total height)/chord H/C is substantially comprised between 0.5 and 0.65.

In another embodiment, the tyre is intended to be fitted to the front wheel of a motorcycle having chord dimensions substantially comprised between 110 and 130 mm. Preferably, the distance f of the radially outer point of the tread from the line passing through the laterally opposite ends of the tread itself of the front tyre may be substantially comprised between 45 and 55 mm. Preferably, the ratio transverse curvature/chord [? the transverse curvature ratio] f/C may be substantially comprised between 0.35 and 0.45, even more preferably between 0.40 and 0.45. Preferably, the ratio (total height)/chord H/C is substantially comprised between 0.6 and 0.75.

The tyres of the invention allow a better performance when they have sidewalls of considerable height, e.g. when they have a sidewall height ratio (H-f)/H higher than 0.35, more preferably higher than 0.4 for the rear tyre and higher than 0.5 for the front tyre.

Preferably, the tyres of the invention have a ratio between shoulder radius and cross section maximum width higher than 0.60.

The carcass structure 2 is typically lined on its inner walls with a sealing layer, or so-called "liner", essentially consisting of a layer of an airtight elastomeric material, adapted to ensure the tight seal of the tyre itself after it has been inflated.

Preferably, the belt structure 6 consists of a layer having a plurality of circumferential windings 7a axially arranged in side-by-side relationship, formed by a rubberized cord or by a strip comprising a number (preferably, from two to five) of rubberized cords, spirally wound at an angle substantially equal to zero (typically of between 0° and 5°) relative to the equatorial plane X-X of the tyre. Preferably, the belt structure extends substantially over the whole crown portion of the tyre. In a preferred embodiment, the belt structure 6 may consist of at least two radially superimposed layers, each consisting of elastomeric material reinforced with cords arranged parallel to one another. The layers are arranged so that the cords of the first belt layer are oriented obliquely relative to the equatorial plane of the tyre, whereas the cords of the second layer also have an oblique orientation, but symmetrically crossed relative to the cords of the first layer (so-called "cross-belt").

In both cases, generally, the cords of the belt structure are textile or metallic cords. Preferably, the tyre 100 may comprise a layer 10 of elastomeric material, located between said carcass structure 2 and said belt structure 6 formed by said circumferential coils, said layer 10 preferably extending over a surface area substantially corresponding to the surface area on which the belt structure 6 develops.

The tread band 8 is made from at least two different elastomeric materials. In the embodiment shown in the figures three different elastomeric materials are present.

In detail, in the embodiment shown in FIGS. 1, 2 and 4 the tread band 8 has two first annular portions L1, L2 made of a first elastomeric material, having a first dynamic shear storage modulus G'1 measured at 70° C., two second annular portions L3, L4 made of a second elastomeric material, having a second dynamic shear storage modulus G'2 measured at 70° C., different form the first dynamic shear storage modulus G'1 measured at 70° C., and a third annular portion L5 made of a third elastomeric material, having a third dynamic shear storage modulus G'3 measured at 70° C.

The third annular portion L5, characterized by the third elastomeric material, is located across the equatorial plane X-X and has an axial development in axial direction smaller than or equal to 20% of the axial development L of the tread band 8.

The second annular portions L3, L4 are opposed to each other relative to the third annular portion L5 and are arranged adjacent to the latter.

Finally, the first annular portions L1, L2 are also opposed to each other relative to the third annular portion L5 and are arranged adjacent to the second annular portions L3, L4, but in an axially outward position relative to the latter.

No other annular portions in addition to those described above are present to form the tread band 8.

Each first annular portion L1, L2 has an axial development in axial direction greater than or equal to 15% of the axial development L of the tread band 8.

Each second annular portion L3, L4 has also an axial development in axial direction greater than or equal to 15% of the axial development L of the tread band 8.

The different elastomeric materials are chosen so that the tread band 8 may have a suitable elastomeric material in the tread band portion contacting the road surface in any driving condition and, thus, at any lean angle.

For obtaining grip when driving on bends at the maximum lean angle and, at the same time, a fast response when accelerating and decelerating while entering and leaving bends, in the finished (vulcanized) tyre the first elastomeric material, located in the first portions L1, L2, has different mechanical features from those of the second elastomeric material, located in the second portions L3, L4.

In particular, the first elastomeric material and the second elastomeric material are chosen so that in the finished (vulcanized) tyre the ratio of the first dynamic shear storage modulus G'1 measured at 70° C. and the second dynamic shear storage modulus G'2 measured at 70° C. is smaller than or equal to 0.85.

Preferably, the first elastomeric material and the second elastomeric material are chosen so that the ratio of the first dynamic shear storage modulus G'1 measured at 70° C. and the second dynamic shear storage modulus G'2 measured at 70° C. is smaller than or equal to 0.7.

Preferably, the first elastomeric material and the second elastomeric material are chosen so that the ratio of the first dynamic shear storage modulus G'1 measured at 70° C. and the second dynamic shear storage modulus G'2 measured at 70° C. is smaller than or equal to 0.4.

For ensuring driving stability and comfort, the third elastomeric material, located in the third portion L5, does not have mechanical features which significantly differ from those of the second elastomeric material, located in the second portions L3, L4.

In particular, the ratio of the third dynamic shear storage modulus G'3 measured at 70° C. and the second dynamic shear storage modulus G'2 measured at 70° C. is greater than or equal to 0.80.

Possibly, the ratio of the third dynamic shear storage modulus G'3 measured at 70° C. and the second dynamic shear storage modulus G'2 measured at 70° C. may be equal to 1.

Referring to the figures, the first annular portion L1, L2 is located in a region of the tread band 8 located at a distance from the equatorial plane X-X equal to at least 30% of the axial development L of the tread band 8. Each first annular portion L1, L2 is delimited inwardly, i.e. towards the equatorial plane X-X, by a second annular portion L3, L4, so as to define a first interface 11 dividing a first annular portion L1, L2 from a second annular portion L3, L4 in axial direction.

Each second annular portion L3, L4, instead, is delimited inwardly, i.e. towards the equatorial plane X-X, by the third annular portion L5, so as to define a second interface 12 dividing each second annular portion L3, L4 from the third annular portion L5 in axial direction.

The first interface 11 and the second interface 12 are arranged so as to synergistically cooperate with the grooves of the tread band 8 for eliminating or at least reducing the feeling of structural discontinuity caused by the different stiffness of the different elastomeric materials located adjacent to each other.

The first interface 11 and/or the second interface 12 may be arranged according to radial directions moving away from the rotation axis of the tyre so as to have a converging, parallel, or diverging course relative to the equatorial plane X-X. Advantageously, the first interface may converge towards the equatorial plane when moving from the inside to the outside of the tread band, being oriented according to a direction inclined by an angle of between 10° and 20° relative to the equatorial plane.

Conveniently, the second interface may converge towards the equatorial plane from the inside to the outside of the tread band, being oriented according to a direction inclined by an angle of between 30° and 40° relative to the equatorial plane.

In the embodiment shown in FIG. 2, the first annular portion L1 my form a radially innermost base layer 13, still made of the first elastomeric material, extending over the whole axial development of the tread band 8.

In a radially outer position, the base layer 13 extends over the whole axial extension of the belt layer 6.

At the first L1, L2 and second annular portions L3, L4, the base layer 13 is thus arranged in radial direction between the belt structure 6 and the first L1, L2 and second annular portions L3, L4.

Figure 3:
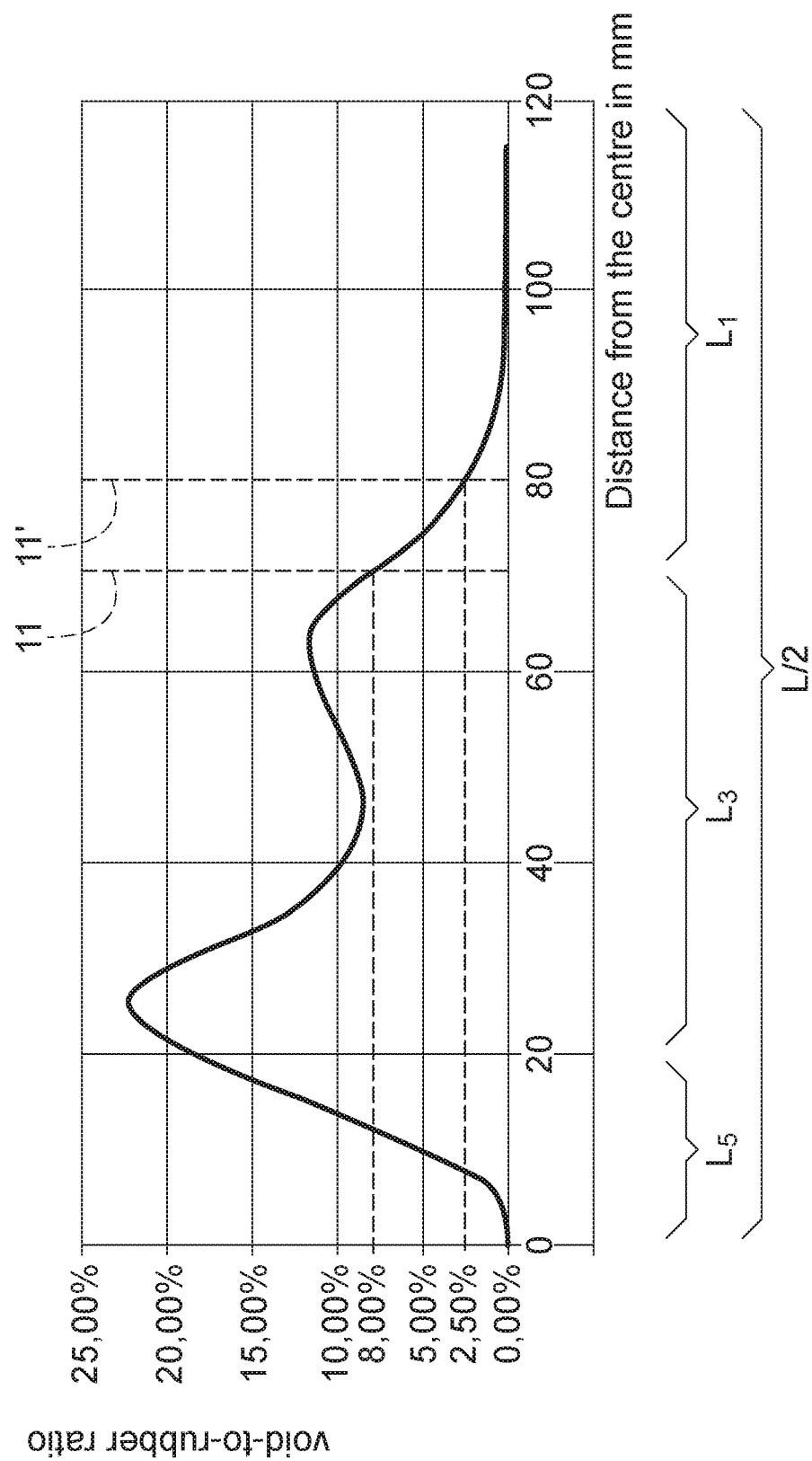
FIG. 3 is a diagram showing the positioning of the interface, in particular the interface between shoulder and adjacent annular portion, in connection with the behavior of the void-to-rubber ratio of the tyre of FIG. 1.

As better shown in FIG. 3, on the tread band 8 a tread pattern is formed comprising a plurality of grooves, which overall define on the tread band a void-to-rubber ratio greater than 4%.

Preferably, for providing the tread band with a suitable stiffness without limiting its draining ability, the grooves overall define on the whole tread band 8 a void-to-rubber ratio smaller than 10%, preferably smaller 8%.

In particular, in each first annular portion L1, L2 the grooves define an overall void-to-rubber ratio equal to or smaller than 3%.

Each first annular portion L1, L2 has in turn an annular region S which is axially more spaced apart from the equatorial plane X-X having a void-to-rubber ratio substantially equal to zero (i.e. equal to zero or smaller than 0.2%). In other words, in such axially outer annular regions S there are substantially no grooves.

In the second annular portions L3, L4 the grooves overall define a void-to-rubber ratio greater than or equal to 5% and smaller than or equal to 10%.

In the third annular portion L5 the grooves overall define a void-to-rubber ratio smaller than 3%, preferably smaller than 1%.

Hereafter the trend of the void-to-rubber ratio on a half portion of the tread band extending between the equatorial plane X-X and an outer edge E, particularly the half portion represented on the right in FIG. 2, will be described, being understood that the same also applies to the other half portion of the tread band.

The grooves of the tread band 8 locally define in the tread band 8 a void-to-rubber ratio which increases along the axial development between a minimum value associated with an annular sector of the first annular portion L1 and a maximum value associated with an annular sector of the second annular portion L3.

For evaluating the void-to-rubber ratio at a sector of the tread band 8, for example an annular sector having a width of 10 mm may be selected and then the void-to-rubber ratio of the selected annular sector may be calculated.

Preferably, the second annular portion L3 is located along the axial development at a distance from the equatorial plane greater than or equal to 5% of the axial development L of the tread band 8.

The maximum value is reached at an annular sector of the second annular portion L3 located along the axial development at a distance relative to the equatorial plane X-X greater than or equal to 20% of the axial development L of the tread band 8.

Preferably, the first interface 11 may be spaced apart from the annular sector of the second annular portion by a distance smaller than 60% of the distance in axial direction between the annular sector of the first annular portion where the maximum of the void-to-rubber ratio is reached and the annular sector of the second annular portion where the minimum of the void-to-rubber ratio is reached.

Conveniently, the first interface 11 is spaced apart from the annular sector of the second annular portion L3 where the maximum of the void-to-rubber ratio is reached by a distance smaller than 50% of the distance in axial direction between the annular sector of the first annular portion L1 where the minimum of the void-to-rubber ratio is reached and the annular sector of the second annular portion L3 where the maximum of the void-to-rubber ratio is reached.

Advantageously, the first interface 11 may be spaced apart from the annular sector of the second annular portion L3 where the maximum is reached by a distance greater than 5% of the distance in axial direction between the annular sector of the first annular portion L1 where the minimum of the void-to-rubber ratio is reached and the annular sector of the second annular portion L3 where the maximum of the void-to-rubber ratio is reached.

Advantageously, the first interface 11 is spaced apart from the equatorial plane X-X by a distance greater than or equal to 27% of the axial development L of the tread band 8.

Preferably, the first interface 11 is spaced apart from the equatorial plane X-X by a distance smaller than or equal to 35% of the axial development L of the tread band 8.

Even more preferably, the interface may be spaced apart from the equatorial plane X-X by a distance smaller than or equal to 33% of the axial development L of the tread band 8.

The second interface 12 is instead spaced apart from the equatorial plane X-X by a distance smaller than or equal to 10% of the axial development L of the tread band 8.

Preferably, the interface may be spaced apart from the equatorial plane X-X by a distance greater than or equal to 5% of the axial development L of the tread band 8.

In FIG. 3 a diagram is reported which shows the positioning of the first interface 11, i.e. the interface between a first annular portion L1 (respectively L2) and a second annular portion L3 (respectively L4), in connection with the trend of the void-to-rubber ratio of the tread band of a tyre according to the present invention, as compared to the positioning of the first interface 11' in a tyre having identical grooves and identical trend of the void-to-rubber ratio.

Along the abscissa it is thus plotted the distance from the equatorial plane X-X expressed in mm, and along the ordinate it is plotted the void-to-rubber ratio.

The solid line represents the trend of the void-to-rubber ratio of the tyre according to the present invention.

The tyre has a void-to-rubber ratio which varies along the axial development between a minimum value located in the first annular portion L1 and a maximum value located in the second annular portion L3.

It can be clearly seen that, based on the teachings of the prior art, for not increasing the structural discontinuities, the interface 11' between the first annular portion L1 and the second annular portion L3 would have been positioned at about 80 mm, corresponding to a void-to-rubber ratio of about 2.5%, i.e. in a region in which there are almost no more grooves.

On the contrary, in the tyre according to the invention the interface 11 between the first annular portion L1 and the second annular portion L3 is positioned at about 70 mm from the center, corresponding to a void-to-rubber ratio of about 8%.

The positioning of the interface 11 between the first annular portion L1 and the axially adjacent one where a given amount and distribution of the groove is present, by modifying the stress distribution acting on the tread band, contributes to reducing the feeling of structural discontinuity due to a different stiffness of the compounds which is transmitted to the motorcycle driver, and thus the feeling of driving instability.

By way of example, in FIGS. 1-3 a tread pattern is shown which satisfies the requirements about the trend of the void-to-rubber ratio and the groove distribution according to the present invention. The tread pattern comprises a module 14 repeated along a direction of circumferential development of the tyre.

The module 14, in the case of a tyre intended to be fitted to the rear wheel of a motorcycle, such as the one shown in FIG. 3, is repeated at least six times along the circumferential development of the tyre. Preferably at least seven times, for example eight times.

Referring to FIGS. 1 and 4, the module 14 has a pair of first grooves 18 oppositely inclined relative to equatorial plane X-X, a pair of second grooves 19, also oppositely inclined relative to the equatorial plane X-X of the tyre, a pair of third grooves 20, also oppositely inclined relative to the equatorial plane X-X of the tyre, a pair of fourth grooves 21 and a pair of fifth grooves 22.

The first 18, the second 19 and the third grooves 20 of the respective pair of grooves have a considerable extension. In particular, each first, second and third groove 18, 19, 20 extends over at least 8% of the circumferential development of the tyre.

Each first, second and third groove 18, 19, 20 extends axially towards the equatorial plane X-X along a rolling direction of the tyre.

Referring to the embodiment shown in FIGS. 1 and 3, it can be seen that the pair of first grooves 18 is arranged circumferentially alternated with the pair of second grooves 19 and the pair of third grooves 20.

Preferably, the grooves 18, 19, 20 of each pair of grooves are mutually circumferentially staggered.

Referring to the embodiment shown in FIGS. 1 and 3, each first groove 18 is located between a second groove 19 and a circumferentially adjacent third groove 20 so as not to have intersection points with them.

The first 18, second 19 and third grooves 20 have a width smaller than or equal to 6 mm The first 18, second 19 and third grooves 20 have a decreasing depth, which gets smaller moving from the equatorial plane X-X towards the shoulders. Preferably, the first 18, the second 19 and the third groove 20 have a depth smaller than or equal to 7 mm.

Referring to the embodiment shown in FIGS. 1 and 3, each first groove 18 comprises, moving axially away from the equatorial plane X-X of the tyre, a first 18' and a second segment 18". The first and the second segments 18', 18" are consecutive and straight.

Preferably, the second segment 18" has a lesser extension as compared to the first segment 18', even more preferably the second segment 18" has a length of between 10% and 15% of the length of the first segment.

In the case of the tyre represented in FIGS. 1, 3, the first segment 18' has an inclination relative to the equatorial plane X-X forming an angle α smaller than 45°, preferably smaller than 40° and preferably greater than 10°.

The second segment 18" has instead an inclination relative to the equatorial plane X-X which is opposed to that of the first segment 18'.

The second grooves 19 are formed by a single straight segment arranged with an inclination forming with the equatorial plane X-X an angle β smaller than 35°, preferably smaller than 30° and preferably greater than 10°.

The third grooves 20 are also formed by a single straight segment arranged with an inclination forming with the equatorial plane X-X an angle γ smaller than 45°, preferably smaller than 40° and preferably greater than 10°.

The fourth 21 and fifth grooves 22 have a lesser extension as compared to the first, second and third grooves 18, 19, 20. In particular, each fourth 21 and fifth groove 22 extends over at most 5% of the circumferential development of the tyre.

Each fourth 21 and fifth groove 22 extends axially away from the equatorial plane X-X. Referring to the embodiment shown in FIGS. 1, 3, it can be seen that the pair of fourth grooves 21 is arranged circumferentially alternated with the pair of fifth grooves 22.

The fourth grooves 21 and the fifth grooves 22 are arranged axially outwardly relative to the first 18, second 19 and third grooves 20.

The fourth grooves 21 are formed by a single straight segment arranged according to an inclination forming with the equatorial plane X-X an angle γ' smaller than 45°, preferably smaller than 40° and preferably greater than 10°.

The third grooves 20 are also formed by a single straight segment arranged according to an inclination forming with the equatorial plane X-X an angle γ" smaller than 45°, preferably smaller than 40° and preferably greater than 10°.

An example of the compounds forming further to a vulcanization the first, the second, and the third elastomeric material is provided for purely indicating purposes in the following table.

By the expression "rubber", "elastomeric polymer" or "elastomer" it is meant a natural or synthetic polymer which, after vulcanization, can be repeatedly stretched at room temperature up to at least twice its original length and, after removing the load, recovers immediately and forcibly approximately its original length (definition according to ASTM, E8 committee, Philadelphia 19).

The amounts of the various components of an elastomeric composition are generally provided as phr, where the term phr means: parts by weight of component by hundred parts by weight of rubber, leaving out extension oils.

TABLE 1

| | Third elastomeric material (L5) | Second elastomeric material (L3-L4) | First elastomeric material (L1-L2) |
|---|---|---|---|
| SSBR | 70 | 80 | 100 |
| BR | 30 | 20 | |
| Extension oil | 26 | 30 | 37.5 |
| CB 1 | 25 | | |
| CB 2 | | 10 | 90 |
| Silica | 75 | 90 | |
| Plasticizer | | 5.2 | 10.0 |
| Resin | 33.0 | 30.0 | 52.0 |
| Wax | 1.0 | 1.0 | 1.0 |
| Antiozonant | 3.0 | 3.0 | 3.0 |
| Antioxidant | | | 2.0 |
| Stearic acid | 2.0 | 2.0 | 2.0 |
| Zinc oxide | 3.0 | 3.0 | 3.0 |
| Silane | 6.0 | 7.2 | |
| Accelerator | 3.0 | 3.0 | 2.0 |
| Thiuram | 3.0 | 3.0 | 1.8 |
| Soluble sulphur | 1.8 | 1.3 | 0.8 |

SSBR styrene-butadiene copolymer from solution (phr given as dry polymer), extended with 37.5 phr of TDAE oil by 100 phr of dry elastomeric polymer (NS522 Zeon)
BR butadiene rubber BR60 (Synthos)
CB2 carbon black N234 (Cabot)
CB1 carbon black N115 (Cabot)
Silica Ultrasil 7000 (Evonik)
Accelerator (N-cyclohexylbenzothiazole-2-sulfenamide) Vulkacit® CZ/C (Lanxess)
Antiozonant 6PPD (N-(1,3-dimethylbutyl)-N'-phenyl-p-phenylenediamine) (Eastaman)
Antioxidant TMQ (polymerized 2,2,4-trimethyl-1,2-dihydroquinoline) (Kemai)
Plasticizer and Extension oil TDAE (Nyas)
Soluble Sulphur (Zolfo Industria)
Resin TT90 (Novares)
Thiuram (Rehin Chemie)
Silane (Evonik)
Wax mixture of N-paraffins (Repsol)
Stearic acid (Undesa)
Zinc oxide; ZnO (Rhein Chemie)

The compounds for the different annular portions of the tread band (L1-L5) according to the present invention, as well as for the other semi-finished products forming the tyre comprise at least one elastomeric diene polymer (a1).

Advantageously, such compounds comprise at least one alpha olefin.

According to an embodiment, said at least one elastomeric diene polymer (a1) may be selected for example from elastomeric diene polymers commonly used in elastomeric compositions crosslinkable with sulphur (vulcanization), which are particularly suitable for tyre manufacturing, or from elastomeric polymers or copolymers with unsaturated chain having a glass transition temperature (Tg) usually below 20° C., preferably in the range from 0° C. to −110° C. These polymers and copolymers may be of natural origin or may be obtained by polymerization in solution, polymerization in emulsion or polymerization in gaseous phase of one or more conjugated diolefins, optionally mixed with at least one comonomer selected from monovinylarenes and/or polar comonomers. For the tread compound, polybutadiene (BR) and/or styrene-butadiene polymers (SBR), e.g. SSBR (styrene-butadiene elastomer from solution), alone or in mixtures, may be used.

Alternatively, mixtures comprising (natural or synthetic) polyisoprene and a styrene-butadiene polymer (SBR) may be used.

Preferably, the styrene-butadiene polymer (SSBR) may be present in the compounds of the present invention in an amount of between about 1 and 100 phr, more preferably between 5 and 95 phr.

Advantageously, the polybutadiene may either be absent or included in the compound of the present invention, particularly in the tread compound, in an amount of between about 1 and 100 phr, preferably between about 1 phr and 80 phr, more preferably of between about 5 and 50 phr.

Preferably, the styrene-butadiene polymer may come from a solution or an emulsion, and comprises the styrene in amounts of between about 10 and 40%, preferably between about 15 and 30%.

Preferably, the styrene-butadiene polymer may be a low-molecular-weight polymer, having an average molecular weight Mn lower than 50000 g/mol, preferably of between 1000 and 50000 g/mol.

The elastomeric material of the different annular portions of the tread band comprises at least one reinforcing filler, in an amount generally of between 1 phr and 130 phr. The reinforcing filler may be selected from metal hydroxides, oxides and hydrated oxides, salts and hydrated salts or mixtures thereof, and/or carbon black.

The reinforcing filler may be selected from the so-called white fillers: silica, alumina, silicates, hydrotalcite, calcium carbonate, kaolin, titanium dioxide and mixtures thereof.

Advantageously, the reinforcing filler may mainly or almost totally be carbon black.

Preferably, the first elastomeric material intended for the first annular portion has a reinforcing filler comprising mainly or substantially carbon black.

The second and third elastomeric materials, respectively intended for the second and the third annular portions, have mainly so-called white fillers, with ratios relative to carbon black of between 10 to 1 and 2 to 1.

For some tread portions and for the compounds of other components of the tyre the reinforcing filler may be carbon black alone or added to the aforesaid inorganic materials (metal hydroxides, oxides and hydrated oxides, salts and hydrated salts or mixtures thereof).

The silica that can be used in the present invention may generally be a pyrogenic silica or, preferably, a precipitated silica, with a BET surface area (measured according to the ISO 5794/1 standard) of between 50 m2/g and 500 m2/g, preferably between 70 m2/g and 200 m2/g.

The elastomeric composition described above and those of other components of the tyre may be vulcanized according to known methods, particularly by means of sulfur-based vulcanization systems, commonly used for elastomeric polymers. To this end, after one or more steps of thermomechanical treatment, a sulfur-based vulcanizing agent is incorporated in the elastomeric composition together with vulcanization accelerators. In the final stage of the treatment, the temperature is usually maintained below 140° C., in order to avoid any undesired pre-crosslinking phenomenon.

The vulcanization agent most advantageously used is sulfur, or sulfur-containing (sulfur-donating) molecules, with accelerators and activators known to those skilled in the art.

Particularly effective activators are zinc-based compounds, in particular ZnO, ZnCO3, zinc salts of saturated or unsaturated fatty acids containing from 8 to 18 carbon atoms, such as, for example, zinc stearate, which are preferably formed in situ in the elastomeric composition starting from ZnO and a fatty acid, and also BiO, PbO, Pb3O4, PbO2, or mixtures thereof.

Commonly used accelerators can be selected from: dithiocarbammates, guanidine, thiourea, thiazoles, sulfonamides, thiuram, ammines, xanthates, or mixtures thereof.

Elastomeric compositions that can be used may comprise other additives commonly selected depending on the specific application for which each composition is intended. For example, the following additives may be added to said elastomeric compositions: antioxidants, anti-aging agents, plasticizers, adhesives, antiozonants, modifying resins, fibers (aramid fibers or fibers of natural origin), or mixtures thereof.

Properties of the Vulcanized Elastomeric Compositions

The dynamical mechanical properties G', G" and Tan delta have been further measured using an RPA device from Alpha Technologies in shear mode. A disc-shaped sample (volume=5 cm3) of raw elastomeric composition of the compounds has been firstly vulcanized (for 10 minutes at 170°) inside the device itself and subsequently subjected to measuring of the dynamic shear storage modulus (G') at a temperature of 70° C., frequency of 10 Hz, deformation from 0.4% to 10%. The dynamical mechanical properties are expressed in term of dynamic shear storage modulus (G') and Tan delta (loss factor). The Tan delta value has been calculated as the ratio of the dynamic shear loss modulus (G") and the dynamic shear storage modulus (G').

The results of the tests carried out on samples of the compositions employed for the annular sectors of the tread band of Table 1 are reported in the following Table 2.

TABLE 2

|  | First elastomeric material (L1-L2) | Second elastomeric material (L3-L4) | Third elastomeric material (L5) |
|---|---|---|---|
| G' @ 70° C. (MPa) | 0.84 | 1.65 | 1.60 |

The ratio of the first dynamic shear storage modulus $G'1$ measured at 70° C. and the second dynamic shear storage modulus $G'2$ measured at 70° C. is thus equal to 0.51.

A ratio of 0.51 may, as in the present case, result from a significant difference between first elastomeric material and second elastomeric material as to their mechanical properties.

The ratio of the second dynamic shear storage modulus $G'2$ measured at 70° C. and the third dynamic shear storage modulus $G'3$ measured at 70° C. is instead equal to 1.03. Such a ratio indicates a substantial uniformity between third elastomeric material and second elastomeric material as to their mechanical properties, wherein the second elastomeric material has a greater stiffness than that of the third elastomeric material.

In an alternative example the third elastomeric material could have a slightly higher stiffness than that of the second elastomeric material.

Tests on Tyres

The compounds reported in Table 1 have been used to make the annular sectors L1-L5 of the tread band of supersport tyres for a 190/55 ZR 17 rear wheel having the shown tread pattern.

The choice of performing tests with rear tyres has been considered particularly challenging, because in sporty driving the rear tyre is thermally more stressed than the front tyre.

The two tyre groups T1 (comparison) and T2 (invention) have annular sectors L1-L5 made of the elastomeric materials as described in Table 1, wherein the interfaces were positioned as reported in Table 3 referring to a half section of a tyre having an overall transverse development of 240 mm (development of the half section of 120 mm). The values are reported starting from the equatorial plane. In Table 3 the void-to-rubber ratio of the annular sector corresponding to the position of the interface is reported.

TABLE 3

| Tyre | T1 | T2 |
|---|---|---|
| First interface 11 (mm) | 80 | 70 |
| Void-to-rubber ratio 11 | 2.5% | 2.5% |
| Edge (mm) | 120 | 120 |
| Second interface 12 (mm) | 25 | 25 |
| Void-to-rubber ratio 12 | 22% | 22% |

Different test sessions were carried out on a private autodrome circuit performing a series of maneuvers for evaluating grip and handling both on dry and on wet ground. The driver evaluation represents an average of the evaluations made during the different maneuvers.

Tyres T1 and tyres T2 were compared in the test on dry ground; inflation pressure 2.9 bars; track asphalt temperature 48° C., air temperature 29° C.

In the test on wet ground the conditions were: tyre inflation pressure 2.9 bars; track asphalt temperature 25° C., air temperature 24° C.

The tests were carried out with a Suzuki GSX 1250F.

Table 4 summarizes the score sheet of the test driver. The results of these tests are expressed as a comparison of the tyres T2 according to the invention with the reference tyres T1, considered as a base. The values reported in the following table are a mean value of the results obtained in several test sessions.

In the present case, scores were provided within a range from 1 to 5 (wherein in this range a value equal to 1 indicates a very unsatisfactory performance and a value equal to 5 indicates an excellent performance).

TABLE 4

|  | Tyres | |
|---|---|---|
|  | T1 Reference tyre | T2 Tyre according to the invention |
| Grip on wet ground | 3.5 | 4 |
| Handling on wet ground | 4 | 4 |
| Grip on dry ground | 4 | 4 |
| Handling on dry ground | 4 | 4 |

The results reported in Table 4 show that a tyre according to the teachings of the invention having a compound interface located between the annular portions 1, 2 and 3, 4 respectively 80 mm away from the equatorial plane in the comparison tyre and 70 mm away from the equatorial plane in the tyre according to the invention, with a local void-to-rubber ratio equal to 2.5% (T1) and to 8% (T2), maintains high performance on dry ground and turns out to be surprisingly better on wet ground in terms of both grip and handling, also at lean angles usually not reached on wet road surfaces.

Many modifications can be made in the embodiments described in detail, still remaining within the scope of protection of the invention, defined by the following claims.

The invention claimed is:

1. A motorcycle tyre comprising an equatorial plane (X-X) and a tread band having an axial development, wherein:
   the tread band comprises at least one first annular portion made of a first elastomeric material having a first dynamic shear storage modulus measured at 70° C., at least one second annular portion made of a second elastomeric material having a second dynamic shear storage modulus measured at 70° C. different from the first dynamic shear storage modulus, and at least one third annular portion located across the equatorial plane (X-X);
   the at least one first annular portion is located in a tread band region at a distance from the equatorial plane (X-X) equal to at least 25% of the axial development;
   the at least one second annular portion is adjacent and axially proximal to the at least one first annular portion and defines a first interface dividing the at least one first annular portion from the at least one second annular portion in the axial direction;
   the tread band further comprises a plurality of grooves and a void-to-rubber ratio at the first interface which increases along the axial development from the at least one first annular portion to the at least one second annular portion;
   the void-to-rubber ratio increases from a minimum value associated with an annular sector of the at least one first annular portion to a maximum value associated with an annular sector of the at least one second annular portion,
   the void-to-rubber ratio at the first interface is greater than or equal to 3% and less than or equal to 15%,
   the third annular portion has an overall void-to-rubber ratio equal to or less than 3%,
   the first interface is angled towards the equatorial plane from inside of the tread band to outside of the tread band, and the first interface relative to the equatorial plane (X-X) is angled between 10° and 20°; and
   a second interface dividing the at least one third annular portion from the at least one second annular portion is angled towards the equatorial plane from inside of the tread band to outside of the tread band, and the second interface relative to the equatorial plane (X-X) is angled between 30° and 40°.

2. The motorcycle tyre according to claim 1, wherein the first interface is spaced apart from the equatorial plane by a distance greater than or equal to 27% of the axial development of the tread band.

3. The motorcycle tyre according to claim 1, wherein the grooves of the tread band define an overall void-to-rubber-ratio greater than or equal to 4% and less than or equal to 10%.

4. The motorcycle tyre according to claim 1, wherein the at least one first annular portion has an overall void-to-rubber ratio equal to or less than to 3%.

5. The motorcycle tyre according to claim 1, wherein an annular region of the at least one first annular portion is spaced axially distal relative to the equatorial plane (X-X) and has an overall void-to-rubber ratio substantially equal to zero.

6. The motorcycle tyre according to claim 1, wherein each second annular portion has an overall void-to-rubber ratio greater than or equal to 5% and less than or equal to 10%.

7. The motorcycle tyre according to claim 1, wherein each groove of at least two grooves of the plurality of grooves each forms an inclination with the equatorial plane (X-X) at an angle greater than 10° and less than 40°.

8. The motorcycle tyre according to claim 1, wherein the void-to-rubber ratio at the first interface is greater than or equal to 3% and less than or equal to 10%.

9. The motorcycle tyre according to claim 8, wherein the void-to-rubber ratio at the first interface is greater than or equal to 4% and less than or equal to 9%.

10. The motorcycle tyre according to claim 1, wherein the first interface is spaced apart from the equatorial plane (X-X) by a distance less than or equal to 35% of the axial development of the tread band.

11. The motorcycle tyre according to claim 10, wherein the first interface is spaced apart from the equatorial plane (X-X) by a distance less than or equal to 33% of the axial development of the tread band.

12. The motorcycle tyre according to claim 1, wherein a ratio of the first dynamic shear storage modulus measured at 70° C. and the second dynamic shear storage modulus measured at 70° C. is less than or equal to 0.85.

13. The motorcycle tyre according to claim 12, wherein the ratio of the first dynamic shear storage modulus measured at 70° C. and the second dynamic shear storage modulus measured at 70° C. is less than or equal to 0.7.

14. The motorcycle tyre according to claim 1, wherein the annular sector of the at least one second annular portion is located along the axial development at a distance from the equatorial plane (X-X) greater than or equal to 20% of the axial development of the tread band.

15. The motorcycle tyre according to claim 14, wherein the first interface is spaced apart from the annular sector of the at least one second annular portion by a distance less than 60% of a distance in axial direction between the annular sector of the at least one first annular portion and the annular sector of the at least one second annular portion.

16. The motorcycle tyre according to claim 15, wherein the first interface is spaced apart from the annular sector of the at least one second annular portion by a distance less than 50% of the distance in axial direction between the annular sector of the at least one first annular portion and the annular sector of the at least one second annular portion.

17. The motorcycle tyre according to claim 16, wherein the first interface is spaced apart from the annular sector of the at least one second annular portion by a distance greater than 5% of the distance in axial direction between the annular sector of the at least one first annular portion and the annular sector of the at least one second annular portion.

18. The motorcycle tyre according to claim 1, wherein two first annular portions are opposite each other relative to the third annular portion and two second annular portions are each located between one of the two first annular portions and the third annular portion.

19. The motorcycle tyre according to claim 18, wherein the third annular portion is made of a third elastomeric material having a third dynamic shear storage modulus measured at 70° C. that is different from the first dynamic shear storage modulus measured at 70° C.

20. The motorcycle tyre according to claim 19, wherein the third annular portion has an axial development less than or equal to 20% of the axial development of the tread band.

21. The motorcycle tyre according to claim 20, wherein each second annular portion has an axial development greater than or equal to 15% of the axial development of the tread band.

22. The motorcycle tyre according to claim 21, wherein the at least one first annular portion has an axial development less than or equal to 15% of the axial development of the tread band.

\* \* \* \* \*